UNITED STATES PATENT OFFICE.

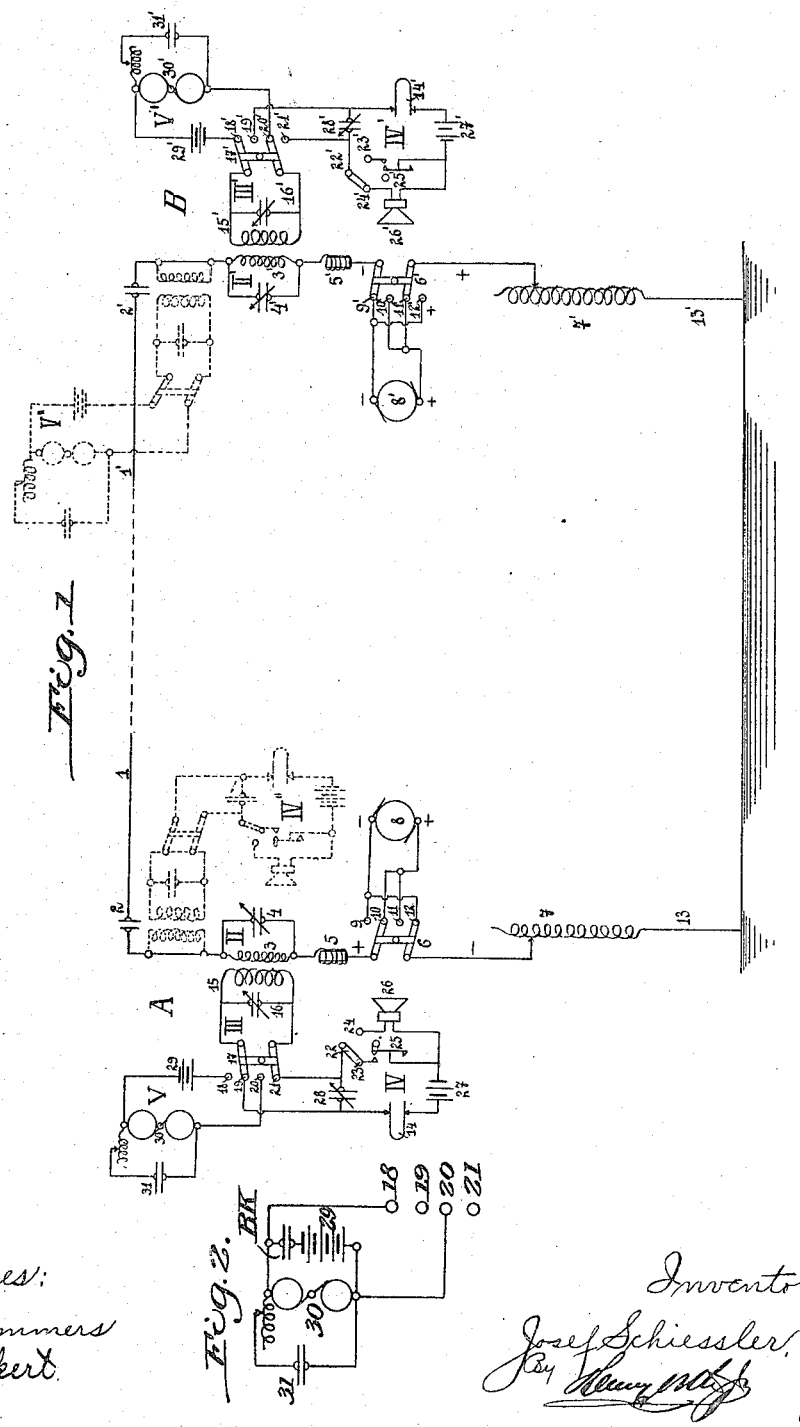

JOSEF SCHIESSLER, OF BADEN, NEAR VIENNA, AUSTRIA.

TELEGRAPH AND TELEPHONE SYSTEM.

1,229,796.

Specification of Letters Patent.

Patented June 12, 1917.

Original application filed February 7, 1912, Serial No. 675,990. Divided and this application filed May 22, 1914. Serial No. 840,236.

*To all whom it may concern:*

Be it known that I, Dr. JOSEF SCHIESSLER, subject of the Emperor of Austria, residing at Baden, near Vienna, Austria, have invented certain new and useful Improvements in Telegraph and Telephone Systems; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, being a division of my application Serial No. 675,990, filed February 7, 1912.

This invention relates to electric telegraphy or telephony by submarine cables and long distance overhead lines, and has for its object to overcome the difficulties which arise in connection with such arrangements owing to the great capacity of the lines.

The systems heretofore known for compensating the detrimental effects of such capacity consist either in an iron-wire spiral wound all over the length of such cable or are based on the well known method of Pupin, which provides a series of self induction coils connected with the line at certain distances throughout its whole length. Now this invention provides a new system for attaining the object above mentioned, which will result in using such cables for telegraphy or telephony with great efficiency and much less cost than with the systems heretofore used, while at the same time none of the disturbances will occur, which are due to the coils, spread over the line, that in most cases (for instance in submarine cables) cannot be inspected or overhauled.

The system used will now be described with reference to the accompanying drawing in which Figure 1 is a diagrammatic view of two stations connected by a submarine cable or other long distance line. Fig. 2 illustrates a modification.

Referring to Fig. 1 two stations A and B are shown at the respective ends of the submarine cable or other long distance line 1—1'; the station A is represented in position for transmitting messages, while station B is in receiving position. As is shown in this figure the arrangement in both stations is identical. The cable or other line is provided at both stations with a condenser 2 and 2' respectively of appropriate capacity, which are connected with one terminal of the coils 3 and 3' respectively of coupling transformers. In parallel to the coils 3 and 3' variable condensers 4 and 4' are placed which together with the coils 3 and 3' form oscillation circuits II and II' capable of being tuned to resonance with each other and with the frequency of another circuit III and III' respectively, formed by the primary coil 15 (15') of the coupling transformer in parallel to which a similar condenser 16 (16') may be connected. The second terminal of the transformer coil 3 (3') is connected with a double lever switch 6 (6'). This switch connects by its terminals 9, 11 or 10, 12 (9', 11' or 10', 12') the positive and the negative poles respectively of a high tension direct current generator 8 (8') with the coil 3 (3') and the cable, while the second lever leading from the second terminal of the generator is grounded through the adjustable self induction coil 7 (7').

This grounding is performed with metallic plates of suitable magnitude or by a metallic net work submerged into the water or buried in the ground. When a source of direct current is used a choking coil 5 (5') provided with an iron core is preferably used in series with the transformer coil 3 (3').

At the receiving station the double lever switch occupies its second position on the terminals 9', 11' thus connecting the poles opposite to those of the transmitter station with the cable and the ground.

The circuit III (III') is likewise connected with a double lever switch 17 (17') capable of connecting this circuit with either the terminals 19, 21, (19', 21') of the transmitter or with the terminals 18, 20, (18', 20') of the receiver. The transmitter circuit IV (IV') comprises a tuned interrupter 14 a source of current 27 (27') connected with one terminal 19 (19') of the double lever switch over said interrupter and branched off at its other side into two parallel branches which contain a Morse key 25 (25') for telegraphy or a telephonic transmitter 26 (26') respectively. A switch 22

(22') is provided for either connecting the Morse key or the telephonic transmitter with the other terminal 21 (21') of the double lever switch. A variable condenser 28 (28') may with advantage be connected in parallel to the said terminals 19 and 21 (19' and 21').

The receiving apparatus 30 (30') is shown switched in at station B at terminals 18', 20'. In parallel with the receiving apparatus an adjustable self induction coil and a condenser 31 (31') may preferably be arranged; it has further been found that it is of advantage to provide in this circuit V a special high tension current intensity 29, Fig. 2, so that even a voltaic pile or a Zamboni dry pile can be used for this purpose. This source of current 29 can be in parallel with the receiving apparatus and a blocking condenser B K may or may not be used in connection with the same.

From the foregoing it will be seen that the submarine cable or other line of great capacity forms together with the condensers 2 and 2' and the self induction coils 7 and 7', 3 and 3', an oscillatory circuit which may be traced from ground 13 over coil 7, double lever switch contact 12 to the negative pole of the high tension direct current source, and from the positive pole of said source over the coils 5 and 3 to the condenser 2, the cable 1—1' the condenser 2' the coils 3' and 5'; the contact 9' of double lever switch 6' to the negative pole of the direct current source 8' and from its positive pole to double lever switch contact 11' over coil 7' to ground 13' and back to ground 13. Instead of the ground connections a return line may be used.

This oscillatory circuit is charged by the high tension generators in a continuous way and the impulses of the transmitting apparatus are superposed on this tension by means of the circuit II (or II' resp.) Thus the resistance of the line need not be overcome by the feeble impulses but is overcome by the charging current generated at 8 and 8' and therefore those impulses will have a much greater intensity when incoming.

Furthermore special receiving apparatus is used, which converts those feeble undulations into well marked signals of the kind desired.

As it has been stated previously in this oscillatory circuit there are contained the oscillatory circuits II and II' respectively, which can be tuned to resonance with each other and with the circuits III and III' respectively, by means of the variable condensers 4 and 4'. The oscillatory circuit II is excited in the transmitting station preferably by impulse excitation, so as to perform free oscillations, which are superposed on the circuit. The impulse excitation (method of M. Wien) is produced by a syntonized interrupter 14 for instance a tuning fork interrupter, a buzzer, a phonic relay or the like, in the transmitting circuit IV which is switched in or out by the Morse key, thus forming groups of oscillations in the secondary circuit, which are by superposition on the line transmitted to the station B. Now, if this station has tuned its circuit II' to the same frequency, the oscillations transmitted by the line will occur only in this circuit, and with these oscillations also the interruptions produced by the Morse key.

It is now obvious that in the case of a plurality of oscillation circuits as indicated on the drawings in dotted lines, being switched in at the receiving station and tuned to a frequency different to each other, messages of different stations, or a plurality of messages from one station can be transmitted, as according to the well known law of Bernoulli these oscillations after having passed in common the cable will in the syntonized receiving circuits be decomposed into their original elements.

Thus a very simple kind of multiplex telegraphy is rendered possible that is based only on the syntonizing of the oscillation circuits II and II', which can be very easily performed.

In the same way a multiplex telephony can be obtained, only slight modifications of the circuits being necessary. The waves due to spoken sounds must in this case be superposed directly on the secondary circuit II, as it would not be possible to obtain good results by their superposition on the interrupter circuit. In the receiving station the oscillations thus obtained are then again decomposed into their elements by the syntonization of the circuits.

*Operation.*

A description of the general system and the apparatus used having been given, the operation of the same will be explained in the following:

Referring to Fig. 1 the station which has to transmit telephonic or telegraphic signals or messages switches in contacts 10 and 12 and contacts 19 and 21 by means of the double lever switches 6 and 17 respectively, thus connecting the positive pole of the high-tension generator with the line and the circuit III with the transmitting apparatus. The station B on the contrary has its double lever switches 6' and 17' placed on contacts 9' and 11' and contacts 18' and 20' respectively, thus connecting the negative pole of the generator 8' with the line, and the circuit III' with the receiving apparatus. The other poles of the generators 8 and 8' are connected to the ground over adjustable self-induction coils 7 and 7' respectively. Now the oscillation circuit traced from ground 13 over cable or line 1—1' to ground 13', as it has been stated previously, is charged electrostatically by the high tension generators 8 and 8'. This is done by means of the condensers 2 and 2' at the beginning and the end of the line, the near side condenser plates of which are loaded by the tension of the generators, while the off-side plates by induction are charging the cable or line up to a tension equal to that of the generator. The impulses given to transmit messages can now be superposed on this charged line circuit and thereby are freed from overcoming the resistance of this circuit. The switch 22 is represented turned to contact 23 which leads to the Morse key 25 and when this key is operated, a series of interruptions is sent through the circuits IV and III, which impulses are preferably reinforced by means of the variable condenser 28 in parallel to the above named circuits. At each impulse in the circuit III the circuit II which must be suitably coupled with the circuit III comes into very slightly damped oscillations which are superposed on the tension existing in the line circuit. These oscillations pass condenser 2 cable 1—1' and condenser 2' and penetrate into circuit II' which is tuned to the same frequency with circuit II. This syntonizing as well as the adjustment of the coupling between the circuits II and III and II' and III' respectively is performed by means of the variable condensers 4 and 4' respectively. Preferably a capacitative inductive coupling according to Patent No. 1,116,130, dated November 3, 1914, is used for this purpose. The oscillations thus obtained in the circuit II' which generate corresponding oscillations in the coil 15' and thereby in the circuit III' now act upon the receiving apparatus 30'. It must be noted however that the circuit III' is permanently under the action of a current of low intensity but of comparatively high tension, due to the source of current 29' on which the oscillations are superposed thus obtaining an undulatory current to act upon the receiving apparatus 30'. With respect to Fig. 2, it should be observed that the blocking condenser B K prevents the current of low intensity but of comparatively high tension emanating from the source of current 29 (Zamboni dry pile, etc.) to spread across the receiving apparatus 30 and to charge the coils appertaining thereto; otherwise the action is exactly the same as that hereinbefore set forth. For if the circuit V happens to be without current from the very start, then the superimposed alternating currents of the line require comparatively much time to charge the condenser 31. However, if the circuit has already been charged by the high tension source of current 29, then the superposed alternating currents of low intensity of the line will suffice to cause a rapid discharge of the condenser 31.

Of course other arrangements and modifications will be possible and appear to those skilled in the art without departing from the scope of the invention.

Claims.

1. In a telegraph and telephone system, a pair of condensers, a line included between said condensers, a grounded generator for each condenser, means to change the polar connection of each generator to said condensers whereby the positive pole of one generator and the negative pole of the other generator may be connected to said condensers and vice versa according to the direction of transmission over said line, a local circuit at each end of the line arranged to superimpose conductive current on that portion of the line between the generator and condenser, said local circuits including means to adjust them to resonance with one another.

2. In a telegraph and telephone system, a pair of condensers, a line included between them, a grounded generator connected to each condenser, an oscillating circuit including an adjustable capacity included between each generator and its pertaining condenser, a local circuit including means to impress upon said oscillating circuit current undulations in accordance with signals, a local receiving circuit at each end of said line including a capacity and receiving means, and a switch controlling the operative relation of the sending or the receiving circuits to the oscillating circuit, and means to reverse the terminal connections of the generators to line.

3. In a telephone and telegraph system, a line having a certain capacity, an adjustable self induction at each end of the same to form an oscillating circuit, means to close said circuit, a condenser inserted at each end of the line, generators producing a high voltage current for charging the line connected with terminals of different polarity at the ends of the line, said generators being inserted permanently into the oscillation circuit, a signaling device for superimposing oscillating signaling currents upon the permanent high voltage current charge of the line and a receiver operated by the said oscillating signaling currents.

4. In a telegraph and telephone system, a line having a certain capacity, adjustable self inductions at each end of the line to form an oscillation circuit, means to close said circuit, condensers at each end of the line, generators connected with the oscillation circuit with terminals of different polarities at opposite ends of the same to impress a high voltage charging upon it, additional self inductions connected in series with the line each having an adjustable condenser connected in parallel therewith to form an oscillation circuit tuned to a definite frequency, further self inductions forming part of an oscillation circuit at each station and tuned to a definite frequency inductively connected with said additional self inductions of the charged line, a vibration generator and a signaling device in connection with each of the latter oscillation circuits, and switches adapted to connect said oscillation circuits with a receiving arrangement.

In testimony that I claim the foregoing as my invention, I have signed my name in presence of two subscribing witnesses.

Dr. JOSEF SCHIESSLER.

Witnesses:
AUGUST FUGGER,
ADA MARIA BERGER.